United States Patent
Himmelmann

(10) Patent No.: US 9,783,299 B2
(45) Date of Patent: Oct. 10, 2017

(54) PRESSURE COMPENSATING AIR CURTAIN FOR AIR CUSHION SUPPORTED CARGO LOADING PLATFORM

(71) Applicant: Goodrich Corporation, Charlotte, NC (US)

(72) Inventor: Richard Himmelmann, Beloit, WI (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/373,536

(22) Filed: Dec. 9, 2016

(65) Prior Publication Data

US 2017/0088263 A1 Mar. 30, 2017

Related U.S. Application Data

(62) Division of application No. 14/512,066, filed on Oct. 10, 2014, now Pat. No. 9,555,888.

(51) Int. Cl.
| | | |
|---|---|---|
| *B65G 51/03* | (2006.01) | |
| *B64D 9/00* | (2006.01) | |
| *B64C 1/20* | (2006.01) | |
| *B60V 3/02* | (2006.01) | |

(52) U.S. Cl.
CPC ............... *B64D 9/00* (2013.01); *B60V 3/025* (2013.01); *B64C 1/20* (2013.01); *B65G 51/03* (2013.01); *B64D 2009/006* (2013.01)

(58) Field of Classification Search
CPC  B65G 51/03; B65G 25/04; B65G 2814/0398; B64C 1/20; B64C 1/22; B64D 9/00; B64D 1/10; B64D 2009/006; H02J 7/025; B64F 1/32

USPC ..... 406/51, 73, 76, 88, 192, 198; 198/468.6, 198/468.9; 244/118.1, 137.1; 414/676
See application file for complete search history.

(56) References Cited

U.S. PATENT DOCUMENTS

| | | |
|---|---|---|
| 1,437,964 A | 12/1922 | Fitch |
| 2,918,183 A | 12/1959 | Petersen |
| 3,055,446 A | 9/1962 | Vaughen |
| 3,081,886 A | 3/1963 | Flexman et al. |
| 3,190,460 A | 6/1965 | Rubin |
| 3,209,929 A | 10/1965 | Petersen et al. |

(Continued)

FOREIGN PATENT DOCUMENTS

| | | |
|---|---|---|
| AU | 442872 | 11/1973 |
| BE | 723545 | 4/1969 |

(Continued)

OTHER PUBLICATIONS

Extended European Search Report dated Feb. 9, 2016 in European Application No. 15181603.0.

(Continued)

*Primary Examiner* — Joseph Dillon, Jr.
(74) *Attorney, Agent, or Firm* — Timothy Buckley; Snell & Wilmer L.L.P.

(57) ABSTRACT

The present disclosure includes cargo loading systems and components including cargo systems utilizing one or more air cushions to elevate one or more cargo shuttles. The air cushions are formed by one or more air curtains, which include pressure compensating seals. The seals allow the air curtains to contact and seal against a floor panel, reducing leakage from the air cushion.

12 Claims, 6 Drawing Sheets

(56) References Cited

U.S. PATENT DOCUMENTS

| | | | |
|---|---|---|---|
| 3,513,934 A | 5/1970 | Crowley | |
| 3,561,623 A | 2/1971 | McCaul | |
| 3,595,407 A * | 7/1971 | Muller-Kuhn | B64F 1/32 244/137.1 |
| 3,597,117 A | 8/1971 | Zoehfeld | |
| 3,756,342 A | 9/1973 | Burdick | |
| 3,756,544 A | 9/1973 | Bader | |
| 3,773,391 A | 11/1973 | Crandall et al. | |
| 3,776,492 A | 12/1973 | Iben | |
| 3,780,823 A | 12/1973 | Michaud | |
| 3,796,279 A | 3/1974 | Burdick | |
| 3,807,035 A | 4/1974 | Moorman | |
| 3,809,268 A | 5/1974 | Lutz | |
| 3,869,028 A | 3/1975 | Sawada | |
| 3,899,092 A | 8/1975 | Nordstrom | |
| 3,908,785 A | 9/1975 | Vaughen | |
| 3,986,605 A | 10/1976 | Dooley et al. | |
| 4,131,320 A | 12/1978 | Volat et al. | |
| 4,139,071 A | 2/1979 | Tackett | |
| 4,155,421 A | 5/1979 | Johnson | |
| 4,216,927 A | 8/1980 | Byrd | |
| 4,304,521 A | 12/1981 | Hammond | |
| 4,353,457 A | 10/1982 | Haley | |
| 4,354,796 A | 10/1982 | Bergman | |
| 4,441,571 A | 4/1984 | Wood | |
| 4,544,319 A | 10/1985 | Folling et al. | |
| 4,567,957 A | 2/1986 | Johnson | |
| 4,600,169 A | 7/1986 | Koster et al. | |
| 4,618,292 A | 10/1986 | Judge et al. | |
| 4,658,951 A * | 4/1987 | Saunders | B65G 47/261 198/718 |
| 4,676,699 A | 6/1987 | Leonov | |
| 4,804,077 A | 2/1989 | John | |
| 4,815,926 A | 3/1989 | Chaffee et al. | |
| 4,878,635 A | 11/1989 | Nordstrom | |
| 4,951,770 A | 8/1990 | Vaughen | |
| 4,984,756 A | 1/1991 | Anders | |
| 5,120,184 A | 6/1992 | Gerawan | |
| 5,137,367 A | 8/1992 | Madonia et al. | |
| 5,184,366 A | 2/1993 | Rawdon | |
| 5,207,115 A | 5/1993 | Takei | |
| 5,226,773 A | 7/1993 | Morito | |
| 5,311,973 A | 5/1994 | Tseng et al. | |
| 5,350,270 A | 9/1994 | Stallard et al. | |
| 5,456,556 A | 10/1995 | Petrovic | |
| 5,467,827 A * | 11/1995 | McLoughlin | A62C 27/00 137/355.17 |
| 3,282,359 A | 11/1996 | Satterfield, Jr. | |
| 5,634,636 A | 6/1997 | Jackson et al. | |
| 5,690,567 A | 11/1997 | DeNijs et al. | |
| 5,779,296 A * | 7/1998 | Hewko | A61G 1/06 244/118.6 |
| 5,850,906 A | 12/1998 | Dean | |
| 5,893,450 A | 4/1999 | Metivier | |
| 6,193,043 B1 * | 2/2001 | Langston | B65G 13/11 193/35 SS |
| 6,196,788 B1 | 3/2001 | Talbot et al. | |
| 6,296,588 B1 | 10/2001 | Ciemniecki | |
| 6,310,286 B1 | 10/2001 | Troxel | |
| 6,427,947 B1 | 8/2002 | Rohrlick et al. | |
| 6,495,761 B1 | 12/2002 | Hacker | |
| 6,517,028 B2 | 2/2003 | Huber | |
| 6,630,633 B1 | 10/2003 | Uber et al. | |
| 6,640,963 B2 | 11/2003 | Lecrivain | |
| 6,923,606 B2 * | 8/2005 | Fehrle | A61G 1/06 211/173 |
| 7,073,994 B2 | 7/2006 | Huber et al. | |
| 7,108,474 B2 | 9/2006 | Moriya et al. | |
| 7,210,280 B2 | 5/2007 | Cottone | |
| 7,393,159 B2 | 7/2008 | Chang et al. | |
| 7,426,974 B1 | 9/2008 | Yeghiayan | |
| 7,494,004 B2 | 2/2009 | Stolyar et al. | |
| 7,513,716 B2 | 4/2009 | Hayashi et al. | |
| 7,643,133 B2 | 1/2010 | Milender | |
| 7,695,235 B1 | 4/2010 | Rallis | |
| 7,785,056 B2 | 8/2010 | Sanford et al. | |
| 7,800,009 B2 | 9/2010 | Gochar, Jr. | |
| 7,845,898 B2 | 12/2010 | Rawdon et al. | |
| 7,886,920 B2 * | 2/2011 | Colley | A63J 5/12 212/316 |
| 7,913,950 B2 | 3/2011 | Huber | |
| 8,056,701 B2 | 11/2011 | Sugimoto | |
| 8,162,571 B2 | 4/2012 | Wada et al. | |
| 8,356,966 B2 | 1/2013 | Voorhees | |
| 8,376,124 B1 | 2/2013 | Rosen | |
| 8,499,922 B2 | 8/2013 | Hoshi | |
| 8,602,204 B2 | 12/2013 | Yang et al. | |
| 8,960,607 B2 * | 2/2015 | Dorris, III | B64D 1/10 244/137.1 |
| 9,156,553 B1 | 10/2015 | Johnson | |
| 9,205,923 B1 | 12/2015 | Himmelmann | |
| 9,284,130 B1 | 3/2016 | Himmelmann | |
| 9,290,270 B2 | 3/2016 | Himmelmann | |
| 9,352,835 B2 | 5/2016 | Himmelmann | |
| 9,387,931 B2 | 7/2016 | Himmelmann | |
| 9,452,901 B2 | 9/2016 | Panzram | |
| 9,511,860 B2 | 12/2016 | Himmelmann | |
| 9,511,861 B2 | 12/2016 | Himmelmann | |
| 9,555,888 B2 | 1/2017 | Himmelmann | |
| 9,567,166 B2 | 2/2017 | Himmelmann | |
| 2002/0164236 A1 | 11/2002 | Fukuhara | |
| 2003/0121726 A1 * | 7/2003 | Berends | B66F 7/20 187/209 |
| 2004/0241267 A1 | 12/2004 | Schultz | |
| 2004/0245397 A1 | 12/2004 | Garcia | |
| 2005/0063809 A1 * | 3/2005 | Walker | B65G 17/002 414/528 |
| 2006/0096395 A1 * | 5/2006 | Weiss | B65G 49/061 73/865.9 |
| 2007/0007391 A1 | 1/2007 | McCoskey | |
| 2007/0023259 A1 | 2/2007 | Schonauer | |
| 2007/0025832 A1 | 2/2007 | Rawdon et al. | |
| 2007/0074891 A1 | 4/2007 | Burke | |
| 2007/0125908 A1 | 6/2007 | Eichholz | |
| 2008/0011119 A1 | 1/2008 | Bartosch | |
| 2008/0257692 A1 | 10/2008 | Wallace | |
| 2008/0267751 A1 | 10/2008 | Safir | |
| 2009/0252568 A1 | 10/2009 | Morin | |
| 2009/0304482 A1 | 12/2009 | Sanford | |
| 2010/0000459 A1 * | 1/2010 | Colangelo | B63B 35/40 114/259 |
| 2010/0006401 A1 | 1/2010 | Flury et al. | |
| 2010/0212982 A1 * | 8/2010 | Lin | B60V 3/025 180/124 |
| 2011/0079427 A1 * | 4/2011 | Powale | H01B 3/427 174/72 A |
| 2011/0215198 A1 | 9/2011 | Panzram et al. | |
| 2011/0240805 A1 | 10/2011 | Komiya | |
| 2011/0273113 A1 | 11/2011 | Hettwer | |
| 2012/0014757 A1 | 1/2012 | Müller | |
| 2012/0138434 A1 | 6/2012 | Trieb | |
| 2012/0170227 A1 | 7/2012 | Bayliss | |
| 2012/0262849 A1 | 10/2012 | Prax | |
| 2013/0011230 A1 * | 1/2013 | Barry | B61D 47/00 414/399 |
| 2013/0075065 A1 | 3/2013 | Degner et al. | |
| 2013/0287505 A1 | 10/2013 | Seibt | |
| 2013/0313073 A1 | 11/2013 | Huber | |
| 2014/0097296 A1 | 4/2014 | Sankrithi | |
| 2014/0338557 A1 | 11/2014 | Zhou | |
| 2014/0367515 A1 | 12/2014 | Lohmann | |
| 2014/0373747 A1 | 12/2014 | Yagci | |
| 2014/0377017 A1 | 12/2014 | Panzram | |
| 2015/0158404 A1 * | 6/2015 | Pylypenko | B60N 2/525 248/575 |
| 2015/0225082 A1 | 8/2015 | Levron | |
| 2015/0298808 A1 | 10/2015 | Huber | |
| 2016/0052630 A1 | 2/2016 | Himmelmann | |
| 2016/0101857 A1 | 4/2016 | Himmelmann | |
| 2016/0101858 A1 | 4/2016 | Himmelmann | |
| 2016/0101859 A1 | 4/2016 | Himmelmann | |
| 2016/0101860 A1 | 4/2016 | Himmelmann | |

(56) References Cited

U.S. PATENT DOCUMENTS

| | | | |
|---|---|---|---|
| 2016/0101861 | A1 | 4/2016 | Himmelmann |
| 2016/0101862 | A1 | 4/2016 | Himmelmann |
| 2016/0101863 | A1 | 4/2016 | Himmelmann |
| 2016/0101947 | A1 | 4/2016 | Himmelmann |
| 2016/0194081 | A1 | 7/2016 | Himmelmann |
| 2016/0194083 | A1 | 7/2016 | Himmelmann |
| 2016/0221763 | A1 | 8/2016 | Himmelmann |
| 2017/0036763 | A1 | 2/2017 | Himmelmann |
| 2017/0043874 | A1 | 2/2017 | Himmelmann |

FOREIGN PATENT DOCUMENTS

| | | |
|---|---|---|
| CA | 903562 | 6/1972 |
| DE | 3440933 | 10/1985 |
| DE | 102008040751 | 1/2010 |
| DE | 102010035099 | 2/2012 |
| EP | 0377692 | 7/1990 |
| EP | 1547893 | 6/2005 |
| EP | 2815970 | 12/2014 |
| FR | 1360952 | 5/1964 |
| FR | 2340636 | 9/1977 |
| FR | 2448454 | 9/1980 |
| GB | 1210244 | 10/1970 |
| GB | 2182015 | 5/1987 |
| JP | 2000128322 | 5/2000 |
| WO | 8706909 | 11/1987 |
| WO | 8801975 | 3/1988 |
| WO | 9819940 | 5/1998 |
| WO | 0066463 | 11/2000 |
| WO | 2005028248 | 3/2005 |
| WO | 2005039036 | 4/2005 |
| WO | 2008091287 | 7/2008 |
| WO | 2014049590 | 4/2014 |

OTHER PUBLICATIONS

Extended European Search Report dated Feb. 11, 2016 in European Application No. 15189145.4.
Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.
Notice of Allowance dated Mar. 24, 2016 in U.S. Appl. No. 14/512,113.
Preinterview First Office Action dated Sep. 8, 2016 in U.S. Appl. No. 14/512,056.
Supplemental Notice of Allowability dated Jun. 3, 2016 in U.S. Appl. No. 14/512,113.
Extended European Search Report dated Jun. 22, 2016 in European Application No. 16153483.9.
Preinterview First Office Action dated Jun. 30, 2016 in U.S. Appl. No. 14/512,056.

Extended European Search Report dated Jul. 11, 2016 in European Application No. 16150150.7.
Notice of Allowance dated Oct. 11, 2016 in U.S. Appl. No. 14/512,066.
Corrected Notice of Allowability dated Oct. 27, 2016 in U.S. Appl. No. 14/512,118.
Notice of Allowance dated Oct. 7, 2016 in U.S. Appl. No. 14/512,118.
Notice of Allowance dated Oct. 11, 2016 in U.S. Appl. No. 14/512,011.
Corrected Notice of Allowability dated Nov. 1, 2016 in U.S. Appl. No. 14/512,011.
Preinterview First Office Action dated Oct. 25, 2016 in U.S. Appl. No. 14/610,391.
Office Action dated Oct. 26, 2016 in U.S. Appl. No. 14/511,559.
Partial European Search Report dated Mar. 18, 2016 in European Application No. 15189110.8.
Notice of Allowance dated Apr. 1, 2016 in U.S. Appl. No. 14/511,645.
Final Office Action dated Apr. 22, 2016 in U.S. Appl. No. 14/511,559.
Supplemental Notice of Allowability dated May 3, 2016 in U.S. Appl. No. 14/512,113.
Preinterview First Office Action dated Sep. 4, 2015 in U.S. Appl. No. 14/512,000.
Notice of Allowance dated Oct. 19, 2015 in U.S. Appl. No. 14/512,000.
Notice of Allowance dated Nov. 13, 2015 in U.S. Appl. No. 14/464,323.
Office Action dated Nov. 17, 2015 in U.S. Appl. No. 14/511,559.
Corrected Notice of Allowability Jan. 7, 2016 in U.S. Appl. No. 14/464,323.
Preinterview First Office Action dated Jan. 7, 2016 in U.S. Appl. No. 14/512,113.
Notice of Allowance dated Jan. 20, 2016 in U.S. Appl. No. 14/511,553.
Notice of Allowance dated Oct. 4, 2016 in U.S. Appl. No. 14/512,127.
Corrected Notice of Allowability dated Oct. 27, 2016 in U.S. Appl. No. 14/512,127.
Corrected Notice of Allowability dated Dec. 15, 2016 in U.S. Appl. No. 14/512,127.
U.S. Appl. No. 15/373,536 filed Dec. 9, 2016 and entitled Pressure Compensating Air Curtain for Air Cushion Supported Cargo Loading Platform.
Extended European Search Report dated Jul. 4, 2016 in European Application No. 15189110.8.
Notice of Allowance dated Dec. 21, 2016 in U.S. Appl. No. 14/1610,391.
Preinterview First Office Action dated Dec. 21, 2016 in U.S. Appl. No. 14/589,742.
Restriction Requirement dated Apr. 20, 2017 in U.S. Appl. No. 15/373,536.
Notice of Allowance dated May 16, 2017 in U.S. Appl. No. 14/512,056.
Himmelmann, et al., U.S. Appl. No. 15/393,423, filed Dec. 29, 2016 and entitled Compact Centrifgual Air Blowers for Air Cushion Supported Cargo Loading Platform.
Final Office Action dated Feb. 24, 2017 in U.S. Appl. No. 14/512,056.
Notice of Allowance dated Mar. 10, 2017 in U.S. Appl. No. 14/511,559.
Corrected Notice of Allowability dated Apr. 10, 2017 in U.S. Appl. No. 14/511,559.
First Action Interview Office Action dated Apr. 18, 2017 in U.S. Appl. No. 14/589,742.

* cited by examiner

PRESSURE COMPENSATING AIR CURTAIN FOR AIR CUSHION SUPPORTED CARGO LOADING PLATFORM

CROSS REFERENCE TO RELATED APPLICATIONS

This application is a divisional application of, and claims priority to, U.S. application Ser. No. 14/512,066, filed Oct. 10, 2014 and titled "PRESSURE COMPENSATING AIR CURTAIN FOR AIR CUSHION SUPPORTED CARGO LOADING PLATFORM," which is hereby incorporated by reference in its entirety.

FIELD

The present disclosure relates generally to cargo loading systems and, more specifically, to cargo loading systems utilizing pressure compensating air cushions.

BACKGROUND

Conventional aircraft cargo systems typically include various tracks and rollers that span the length of an aircraft. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

A pressure compensating air cushion for supporting a cargo loading system in accordance with the present disclosure may comprise an air cushion formed by an air curtain positioned within a channel of a frame and a pressure compensating seal comprising a seal spring positioned above and configured to exert a downward pressure on the air curtain.

In various embodiments, air from the air cushion may pass through a pressure supply hole of the frame and into the channel of the frame and may contact the spring. The seal spring may comprise a metallic material in an undulating pattern. The air curtain may comprise a polymeric material, and may include a sealing point configured to form a seal against a floor panel. Four air curtains may be positioned perpendicularly to each other to form a square-shaped air cushion.

An air cushion cargo shuttle in accordance with the present disclosure may comprise a frame having a channel. An air curtain may be disposed within the channel of the frame. An air blower may be configured to blow air into an air volume beneath the air cushion cargo shuttle. An air cushion may be formed by the air curtain configured to maintain the air volume. A seal spring may be positioned above and configured to exert a downward pressure on the air curtain. Air from the air volume passes through a pressure supply hole of the frame and into the channel of the frame. The air from the air volume may pass through a pressure supply hole in the frame to contact the seal spring. The air curtain may comprise a sealing point configured to form a seal against a floor panel. The seal spring may comprise a metallic material in an undulating pattern. A backing plate may be positioned above the air curtain within the channel. The air blower may be a centrifugal air blower.

An air cushion cargo shuttle may comprise a pressure compensating air cushion formed by an air curtain positioned within a frame of the air cushion cargo shuttle. An air blower may be configured to blow air into an air volume beneath the air cushion cargo shuttle. A seal spring may be configured to exert a downward pressure on the air curtain. In various embodiments, the air curtain may be configured to maintain the air volume. Air from the pressure compensating air cushion may pass through a pressure supply hole of the frame to contact the seal spring. The air curtain may comprise a sealing point configured to form a seal against a floor panel. The air blower may be a centrifugal air blower.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Cargo loading systems of the present disclosure comprise one or more air cushions to elevate one or more cargo shuttles. The air cushions are formed by one or more air curtains, which include pressure compensating seals. The seals allow the air curtains to contact and seal against a floor panel, reducing leakage from the air cushion.

Figure 1:
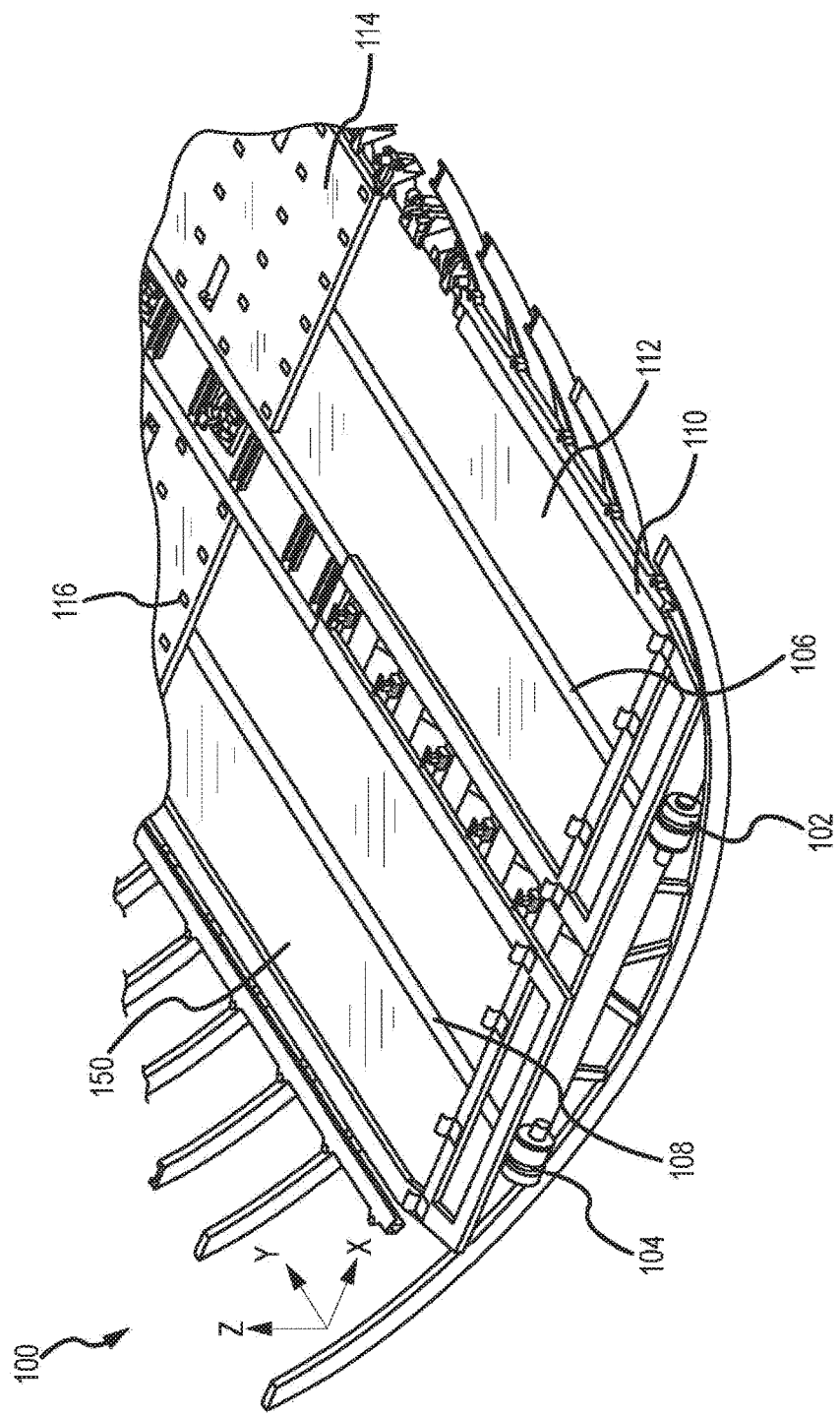
FIG. 1 illustrates a portion of a cargo management system, in accordance with the present disclosure.
Figure 2:
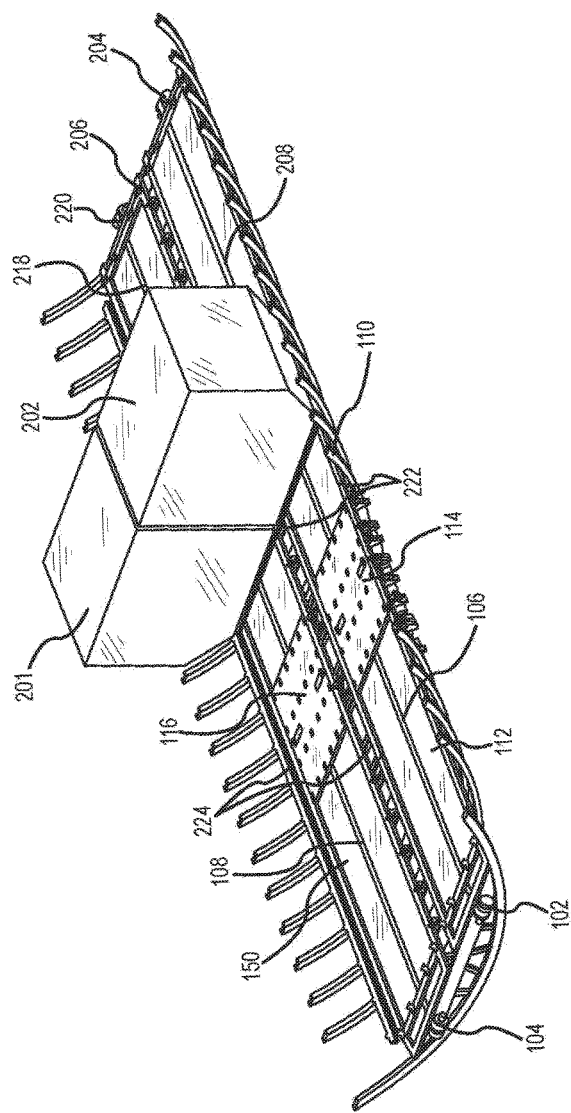
FIG. 2 illustrates a portion of a cargo management system, in accordance with the present disclosure.

With reference to FIGS. 1 and 2, an aircraft cargo management system 100 in accordance with the present disclosure is illustrated using an x, y, and z axes for ease of illustration. Air cushion cargo shuttle 114 and 116 are shown forward of an aft portion of an aircraft. In various embodiments, air cushion cargo shuttle 114 may be coupled to an aft drive shuttle belt 106 and air cushion cargo shuttle 116 may be coupled to an aft drive shuttle belt 108. Aft drive shuttle belt 106 is coupled to an aft drive shuttle unit 102, and aft drive shuttle belt 108 is coupled to an aft drive shuttle unit 104.

In various embodiments, a floor panel 112 is positioned beneath air cushion cargo shuttle 114. Similarly, a floor panel 150 may be positioned beneath air cushion cargo shuttle 116. As used with respect to air cushion cargo shuttle 114 and 116, the term "beneath" may refer to the negative z direction. As used with respect to air cushion cargo shuttle 114 and 116, the term "above" may refer to the positive z direction. In various embodiments, support rails 222 and 224 are laterally adjacent to floor panels 112 and 150, and may be mounted to another aircraft component, such as an airframe, and may be capable of supporting the weight of cargo. Floor panel 112 may comprise at least one of a composite material or a metallic material.

Air cushion cargo shuttle 114 may, for example, be coupled to forward drive shuttle belt 208 and air cushion cargo shuttle 116 is coupled to forward drive shuttle belt 218. Forward drive shuttle belt 208 is coupled to forward shuttle drive unit 204. Forward drive shuttle belt 218 is coupled to forward shuttle drive unit 220. Cargo 202 is shown as resting on support rails 222 and cargo 201 is shown as resting on support rails 224. In various embodiments, cargo shuttle 116 may be used to lift cargo 201 off support rails 224 in the positive z direction and move cargo 201 forward or aft.

Forward drive shuttle belt 208, forward drive shuttle belt 218, aft drive shuttle belt 106, and aft drive shuttle belt 108 (collectively, a "shuttle belt") may comprise any suitable belt capable of pulling an air cushion cargo shuttle. For example, a shuttle belt may comprise a flat belt. In that regard, a flat shuttle belt may not occupy excess space along the z direction. For example, a shuttle belt may comprise a polyurethane coated belt that includes a communications and power bus. In that regard, the structural support and power/data functions are provided by a single shuttle belt structure. For example, in various embodiments, a shuttle belt may comprise steel wires oriented in parallel and coated with polyurethane to hold the steel wires together, provide anti-friction properties, and noise dampening properties. Among the steel wires may be copper wires or other wires that are capable of carrying an electrical current at any suitable voltage. In that regard, the shuttle belt may comprise one or more copper wires to carry high voltage power and/or low voltage electrical signals that may convey data.

The shuttle belts may be wound around a portion of forward shuttle drive unit 204, forward shuttle drive unit 220, aft drive shuttle unit 102 and aft drive shuttle unit 104 (collectively, "shuttle drive unit"). In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction. The shuttle drive unit may also disengage the electric motor or be otherwise geared in such a manner so that free rotation of the bobbin is allowed. Thus, as forward shuttle drive unit 204 may be rotating its bobbin to pull forward drive shuttle belt 208 forward, aft drive shuttle unit 102 may allow its bobbin to freely rotate in response to the force exerted by forward drive shuttle belt 208 through air cushion cargo shuttle 114. In like manner, as aft drive shuttle unit 102 may be rotating its bobbin to pull aft drive shuttle belt 106 aft, forward shuttle drive unit 204 may allow its bobbin to freely rotate in response to the force exerted by aft drive shuttle belt 106 through air cushion cargo shuttle 114.

Accordingly, as forward shuttle drive unit 220 may be rotating its bobbin to pull forward drive shuttle belt 218 forward, aft drive shuttle unit 104 may allow its bobbin to freely rotate in response to the force exerted by forward drive shuttle belt 220 through air cushion cargo shuttle 116. In like manner, as aft drive shuttle unit 104 may be rotating its bobbin to pull aft drive shuttle belt 108 aft, forward shuttle drive unit 220 may allow its bobbin to freely rotate in response to the force exerted by aft drive shuttle belt 108 through air cushion cargo shuttle 116.

Figure 3:
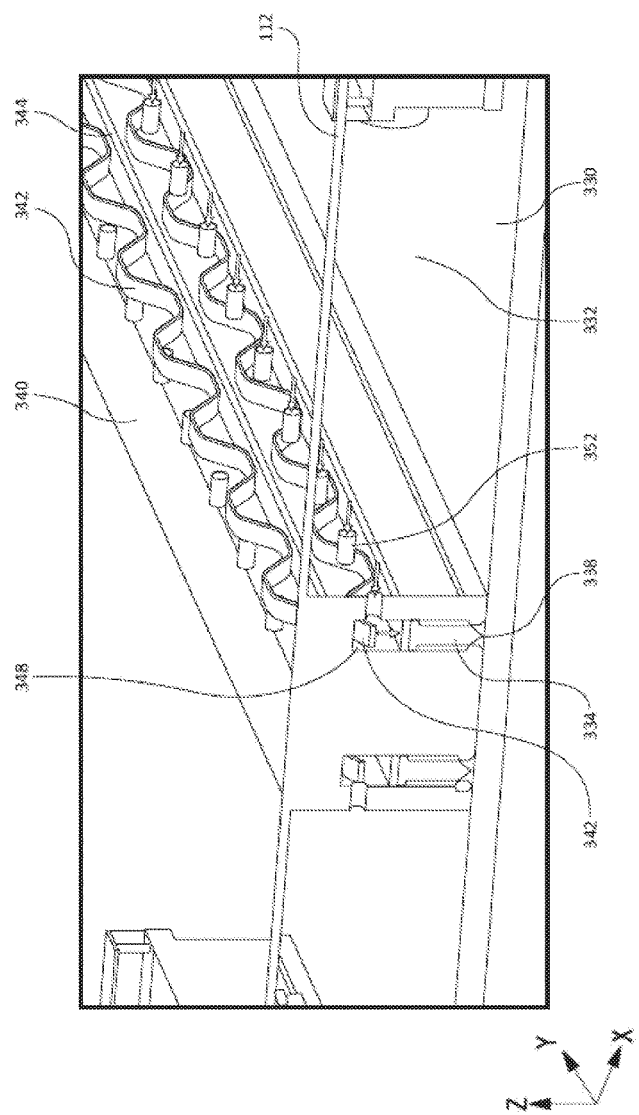
FIG. 3 illustrates a portion of a cargo management system, in accordance with the present disclosure.
Figure 4:
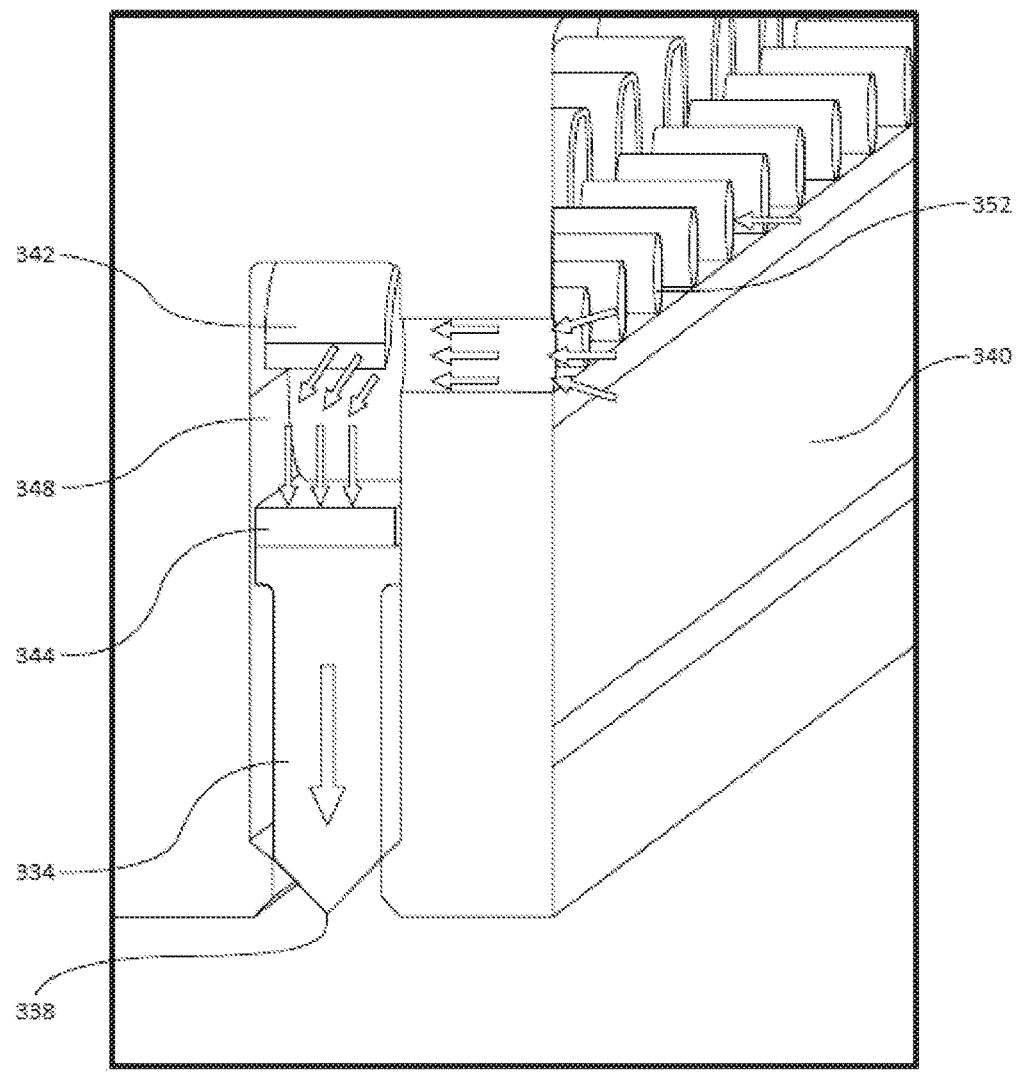
FIG. 4 illustrates a portion of a cargo management system, in accordance with the present disclosure.

With reference to FIGS. 3 and 4, air cushion cargo shuttle 114 may further comprise a pressure compensating air cushion 330 positioned beneath air cushion cargo shuttle 114. It should be understood that air cushion cargo shuttle 116 is similarly structured and thus the features discussed herein relative to air cushion cargo shuttle 114 are also applicable to air cushion cargo shuttle 116. In various embodiments, pressure compensating air cushion 330 comprises an air volume 332. Pressure compensating air cushion 330 is inflated by air pumped into air volume 332, which provides an air cushion on which air cushion cargo shuttle 114 is suspended.

For example, air volume 332 may be maintained beneath air cushion cargo shuttle 114 by an air curtain 334. In various embodiments, air curtain 334 is forced downward against floor panel 112, trapping air volume 332 under air cushion cargo shuttle 114.

In various embodiments, air cushion cargo shuttle 114 comprises a cargo frame 340. Cargo frame 340 may comprise, for example, a channel 348 into which air curtain 334 is located. In various embodiments, channel 348 allows air curtain 334 to move upward and downward (i.e., in the negative z direction) relative to cargo frame 340, allowing the pressure compensated air curtain to remain in contact with floor panel 112 as cargo frame 340 is moved in the positive z direction. Further, cargo frame 340 may comprise multiple channels 348 to accommodate multiple air curtains 334.

In various embodiments, air cushion 330 may comprise multiple air curtains 334 configured to maintain trapped air volume 332. For example, four air curtains 334 may be positioned perpendicularly to each other within multiple channels 348 within cargo frame 340 to form a square-shaped air volume 332. However, any number and configuration of air curtain 334, including a single air curtain, is within the scope of the present disclosure.

In various embodiments, air curtain 334 comprises a sealing point 338. Sealing point 338 may, for example, be forced against floor panel 112 to form a seal against floor panel 112 and to reduce leakage from air volume 332. By reducing such leakage, pressure compensating air cushion 330 may require less air introduced into air volume 332 during operation of aircraft cargo management system 100, which in turn may allow for the use of smaller components, including smaller sized air blowers. Further, the improved sealing capabilities of pressure compensating air cushion 330 may provide for lower operating pressures. For example, cargo system 100 may be operated at as low as 1.5 psi (10.3 kPa) of air pressure.

Sealing point 338 may be forced downward by, for example, a seal spring 342. In various embodiments, seal spring 342 supplies a downward force to air curtain 334, forcing sealing point 338 to contact floor panel 112 and forming a seal to reduce air leakage from air volume 332. In various embodiments, a backup plate 344 is positioned between seal spring 342 and air curtain 334. Backing plate 344 may distribute force from seal spring 342 in a uniformly distributed manner over air curtain 334. Seal spring 342 and/or backing plate 344 may, for example, be positioned above air curtain 334 within channel 348.

In various embodiments, spring 342 may comprise an undulating pattern. For example, spring 342 may have a sinusoidal, wave-like, or otherwise undulating pattern. Spring 342 may comprise a ribbon, wire or wires, or mesh. In various embodiments, spring 342 may comprise a metallic material. Spring 342 may also comprise a polymeric material. Any material and configuration capable of exerting downward force against air curtain 334 is within the scope of the present disclosure.

In various embodiments, cargo frame 340 comprises a multiplicity of air supply holes 352 configured to provide pressure to seal spring 342. For example, air supply holes 352 may be positioned such that air from air volume 332 passes through air supply holes 352 and into channel 348. In such embodiments, air passes into channel 348 above air curtain 334, providing downward force to air curtain 334 and causing sealing point 338 to contact floor panel 112. In various embodiments, air passing through supply holes 352 into channel 348 exerts downward pressure on seal spring 342. As the air pressure increases in air volume 332, increased air pressure is supplied to seal spring 342 through the increased pressure in channel 348, which cause a corresponding increased air pressure exerted downward against air curtain 334. This configuration may be referred to as a pressure compensating seal, as the downward pressure applied to air curtain 334 is proportionate to the air pressure within air volume 332.

Figure 5:
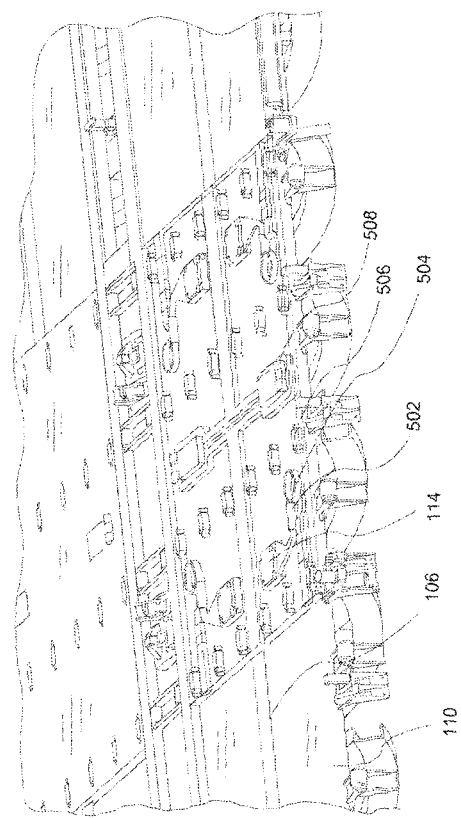
FIG. 5 illustrates a portion of a cargo management system, in accordance with the present disclosure.
Figure 6:
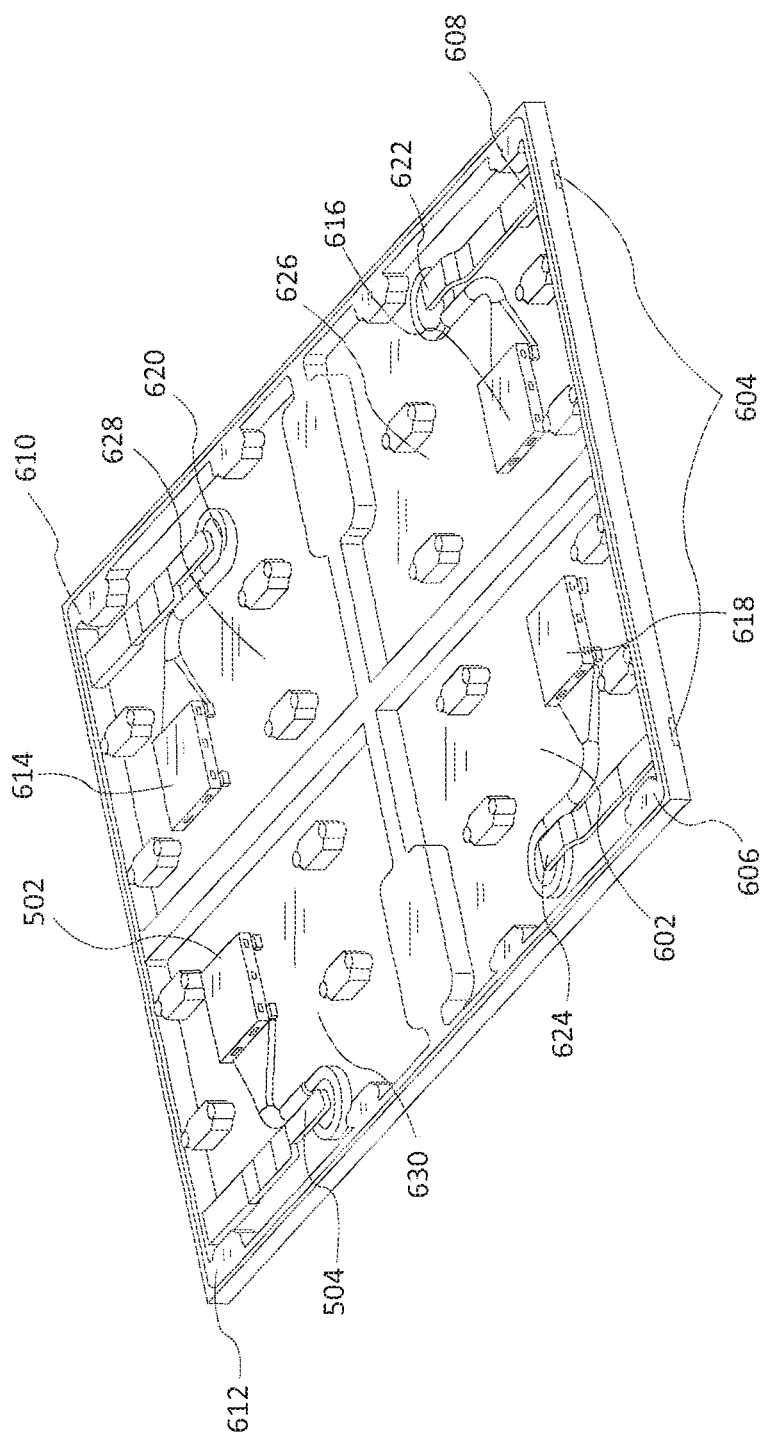
FIG. 6 illustrates a portion of a cargo management system, in accordance with the present disclosure.

With reference to FIGS. 5 and 6, centrifugal air blower 504 may be in fluid communication with and blow air into volume 602. Volume 602 is shown in proximity to floor panel 112. Centrifugal air blower 504 is shown coupled beneath air cushion cargo shuttle 114. Air cushion cargo shuttle 114 may comprise one or more centrifugal air blowers.

Centrifugal air blower 504 is controlled by centrifugal air blower controller 502. Air cushion cargo shuttle 114 may comprise one or more centrifugal air blower controllers. In various embodiments, each centrifugal air blower has one associated centrifugal air blower controller, though in various embodiments one centrifugal air blower controller controls multiple centrifugal air blowers. Centrifugal air blower controller 502 may provide power and instructions to centrifugal air blower 504 to control how and when centrifugal air blower 504 operates. Centrifugal air blower 504 comprises inlets 604. Inlets 604 allow the centrifugal air blower 504 to receive air from outside volume 602 and deliver that air to volume 602. In various embodiments, each centrifugal air blower has one associated inlet, though in various embodiments one centrifugal air blower is associated with multiple inlets. In further embodiments, a single inlet may supply air to one or more centrifugal air blowers.

As shown, air cushion cargo shuttle 114 has four centrifugal air blower controllers 502, 614, 616, and 618 driving four centrifugal air blowers 504, 620, 622, and 624 to blow air into four different volumes 602, 626, 628, and 630. Each centrifugal air blower controller may further comprise a proximity sensor that may be configured to measure the proximity of a portion of air cushion cargo shuttle 114 to floor panel 112. For example, proximity sensors 606, 608, 610 and 612 may be associated with each centrifugal air blower controller 502, 614, 616, and 618. Proximity sensors 606, 608, 610 and 612 may be used in a closed loop control mechanism to modulate the output of four centrifugal air blowers 504, 620, 622, and 624. In that regard, centrifugal air blower controllers 502, 614, 616, and 618 may command four centrifugal air blowers 504, 620, 622 to blow air into volumes 602, 626, 628, and 630 until the proximity sensors 606, 608, 610 and 612 indicate that a desired proximity has been reached.

Moreover, data from proximity sensors 606, 608, 610 and 612 may be used to detect and compensate for uneven cargo loads. For example, in the event cargo 202 shifts to one portion of air cushion cargo shuttle 114 or otherwise exerts more force on a portion of air cushion cargo shuttle 114 relative to another, data from proximity sensors 606, 608, 610 and 612 may detect that one portion of air cushion cargo shuttle 114 is not as far from floor panel 112 as one or more other portions of air cushion cargo shuttle 114. In that regard, where insufficient distance from floor panel 112 is achieved, a centrifugal air blower controller may command its associated centrifugal air blower to increase output to compensate for the uneven load.

In that regard, in operation, cargo such as cargo 202 may be loaded onto air cushion cargo shuttle 114 at an aft position, such as a position proximate aft drive shuttle unit 102. Cargo 202 may be positioned onto air cushion cargo shuttle 114 using power drive unit 508 and roller 506. During loading of cargo 202, air cushion cargo shuttle 114 may be in contact with floor panel 112. Once cargo 202 is suitably positioned on top of air cushion cargo shuttle 114 (where the phrase "on top" in this context may refer to distance across the positive z direction), a control system for centrifugal air blower controller 502 may instruct centrifugal air blower 504 to begin operation. In this manner, air from inlets 604 is pulled into centrifugal air blower 504 and centrifugal air blower 504 blows this air into volume 602. As more air is blown into volume 602, the increased air pressure may act to lift air cushion cargo shuttle 114 apart from floor panel 112. In this context, the phrase "lift apart" may refer to movement of air cushion cargo shuttle 114 in the positive z direction. In various embodiments, the pressure in volume 602 may reach between 1 psi (6.89 kPa) to 10 psi (68.9 kPa), between 2 psi (13.7 kPa) and 6 psi (41.3 kPa), and about 4 psi (27.5 kPa), where the term about in this context may refer to +/−0.5 psi (3.4 kPa).

A control system comprising, for example, a processor and a tangible, non-transitory memory may be configured to be in electrical and/or logical communication with centrifugal air blower controller 502. For example, the control system may communicate with centrifugal air blower controller 502 via one or more shuttle belts. The control system may instruct the centrifugal air blower controller 502 to start, stop, and modulate the output of centrifugal air blower 504.

During operation of centrifugal air blower 504, cargo 202 may lift apart from floor panel 112, thus reducing the friction between air cushion cargo shuttle 114 and the floor panel 112. Stated another way, dry friction may be equal to the coefficient of friction multiplied by the normal force. By eliminating the contact between air cushion cargo shuttle 114 and the floor panel 112, the two surfaces do not interact to cause friction. In various embodiments, there may be contact between air cushion cargo shuttle 114 and the floor panel 112 during operation of centrifugal air blower 504, though the air pressure will oppose the normal force (i.e., force in the negative z direction) exerted by cargo 202 and thus friction will be reduced because of this reduction in the normal force.

While cargo 202 is lifted apart from floor panel 112, the forward shuttle drive unit 204 may rotate its bobbin, causing forward drive shuttle belt 208 to pull air cushion cargo shuttle 114 and cargo 202 forward. Aft drive shuttle unit 104 may be allowed to exert a low level drag force on shuttle drive belt 108, thus allowing aft drive shuttle belt 108 to extend in a forward direction. A low level drag force exerted by aft drive shuttle unit 104 may prevent excessive cargo velocity and may maintain stability in the event an aircraft is not precisely level. Once cargo 202 is positioned in the aircraft at a desired position, the control system may instruct the centrifugal air blower controller 502 to turn off or lower the output of centrifugal air blower 504. In that regard, due to loss of air pressure in volume 602, air cushion cargo shuttle 114 may move in a negative z direction and contact floor panel 112. As air cushion cargo shuttle 114 moves towards floor panel 112, cargo 202 may come to rest on support rails 222. Thus, the air cushion cargo shuttle 114 may separate from the cargo 202 as the cargo 202 is restrained from motion in the negative z direction by support rails 222. In this manner, air cushion cargo shuttle 114 may be brought aft to load additional cargo. The aft drive shuttle unit 102 may rotate its bobbin, causing aft drive shuttle belt 108 to pull air cushion cargo shuttle 114 aft. Additional cargo may now be loaded and the process may proceed again.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pressure compensating air cushion of a cargo system, comprising:
   an air cushion formed by an air curtain positioned within a channel of a frame, said frame constituting a support rails for a cargo shuttle, said air cushion having a top surface for engaging the shuttle; and air blower for providing air to the air cushion
   a pressure compensating seal comprising a seal spring positioned above and configured to exert a downward pressure on the air curtain the air cushion operable to at least two internal volumes, one of which engages the shuttle.

2. The pressure compensating air cushion of claim 1, wherein air from the air cushion passes through a pressure supply hole of the frame and into the channel of the frame.

3. The pressure compensating air cushion of claim 2, wherein the air from the air cushion passes through a pressure supply hole in the frame to contact the seal spring.

4. The pressure compensating air cushion of claim 3, wherein the seal spring comprises a metallic material in an undulating pattern.

5. The pressure compensating air cushion of claim 1, wherein the air curtain comprises a polymeric material.

6. The pressure compensating air cushion of claim 1, wherein the air curtain comprises a sealing point configured to form a seal against a floor panel.

7. The pressure compensating air cushion of claim 1, further comprising four air curtains positioned perpendicularly to each other to form a square-shaped air cushion.

8. An air cushion cargo shuttle having a top surface for receiving cargo, and configured and operable for mating engagement with a cargo system support rails oriented along the long axis of an elongated storage enclosure, comprising:
   a pressure compensating air cushion formed by a top surface for engaging the shuttle and an air curtain positioned within a frame forming a volume of the air cushion cargo shuttle a drive shuttle belt to at least one advance and retract the shuttle along the axis;
   the air blower configured to blow air into an air volume beneath the air cushion cargo shuttle; and a seal spring configured to exert a downward pressure on the air curtain.

9. The air cushion cargo shuttle of claim 8, wherein the air curtain is configured to maintain the air volume.

10. The air cushion cargo shuttle of claim 8, wherein air from the pressure compensating air cushion passes through a pressure supply hole of the frame to contact the seal spring.

11. The air cushion cargo shuttle of claim 8, wherein the air curtain comprises a sealing point configured to form a seal against a floor panel.

12. The air cushion cargo shuttle of claim 8, wherein the air blower is a centrifugal air blower.

* * * * *